US006870305B2

(12) United States Patent
Moler (10) Patent No.: US 6,870,305 B2
(45) Date of Patent: Mar. 22, 2005

(54) APPARATUS FOR MOVING A PAIR OF OPPOSING SURFACES IN RESPONSE TO AN ELECTRICAL ACTIVATION

(75) Inventor: Jeff Moler, Sarasota, FL (US)

(73) Assignee: Viking Technologies, L.C., Sarasota, FL (US)

( * ) Notice: Subject to any disclaimer, the term of this patent is extended or adjusted under 35 U.S.C. 154(b) by 0 days.

(21) Appl. No.: 10/845,943

(22) Filed: May 14, 2004

(65) Prior Publication Data

US 2004/0207294 A1 Oct. 21, 2004

Related U.S. Application Data

(62) Division of application No. 10/067,762, filed on Feb. 6, 2002.

(51) Int. Cl.[7] .............................................. H01L 41/08
(52) U.S. Cl. ....................................................... 310/328
(58) Field of Search ........................................ 310/328

(56) References Cited

U.S. PATENT DOCUMENTS

| 3,144,802 | A | 8/1964 | Faber, Jr. ..................... 84/454 |
| 3,405,289 | A | 10/1968 | Gikow ......................... 310/328 |
| 3,414,779 | A | 12/1968 | Bohm .......................... 317/234 |
| 3,421,109 | A | 1/1969 | Wiggins et al. ............ 331/108 C |
| 3,446,920 | A | 5/1969 | Zuerkr ......................... 310/317 |
| 3,513,309 | A | 5/1970 | Hehemann .................... 250/71 |
| 3,548,314 | A | 12/1970 | Mitchell ...................... 310/317 |
| 3,558,936 | A | 1/1971 | Horan .......................... 310/328 |
| 3,614,486 | A | 10/1971 | Smiley ......................... 310/8.2 |
| 3,649,857 | A | 3/1972 | Knappe ........................ 310/328 |

(List continued on next page.)

FOREIGN PATENT DOCUMENTS

| DE | 19523229 A1 | 1/1997 | ............ B25J/15/08 |
| EP | 0 704 916 A1 | 9/1995 | ............ H01L/41/09 |
| JP | 60-180036 | * 9/1985 | ............ H01H/57/00 |
| JP | 61-150287 | 7/1986 | ............ H01L/41/08 |
| JP | 62-23381 | 1/1987 | ................. 310/311 |

(List continued on next page.)

OTHER PUBLICATIONS

US 5,877,442, 3/1999, Freeland et al. (withdrawn)

Salim R et al: "Kleinste Objekte Im Griff a Grip on Even the Smallest Objects" F&M Feinwerktechnic Mikrotechnic Mikroelektronik, Carl Hanswer GmbH & Co. DE, vol. 104, No. 9, Sep. 1, 1996, pp. 637–640, XP000636588.

Xu Wei, King Tim: "Flexure Hinges for Piezoactuator Displacement Amplifiers: Flexibility, Accuracy, and Stress Considerations" Precision Engingeering, vol. 19, No. 1, Jul. 1996, pp. 4–10, XP002256802.

*Primary Examiner*—Thomas M. Dougherty
(74) *Attorney, Agent, or Firm*—Young & Basile, P.C.

(57) ABSTRACT

An apparatus for moving a pair of opposing surfaces in response to an electrical activation having a support including a rigid non-flexing portion, at least one pivotable arm portion extending from the rigid non-flexing portion, a pair of opposing surfaces with one opposing surface on the at least one pivotable arm portion for movement relative to one another, and a force transfer member operably positioned for driving the at least one pivotable arm portion in rotational movement. An actuator is operably engaged between the rigid portion and the force transfer member to drive the force transfer member in movement relative to the rigid portion to pivot the at least one pivotable arm portion with a loss of motion of less than 40% in response to an electrical activation of the actuator.

21 Claims, 5 Drawing Sheets

U.S. PATENT DOCUMENTS

| | | | |
|---|---|---|---|
| 3,666,975 A | 5/1972 | Balamuth | 310/8.2 |
| 3,731,214 A | 5/1973 | Bers | 330/5.5 |
| 3,749,946 A | 7/1973 | Von Ruti | 310/319 |
| 3,902,084 A | 8/1975 | May, Jr. | 310/8.1 |
| 3,902,085 A | 8/1975 | Bizzigotti | 310/8.3 |
| 4,009,447 A | 2/1977 | Wolf et al. | 310/330 |
| 4,018,124 A | 4/1977 | Rosado | 84/454 |
| 4,044,239 A | 8/1977 | Shimauchi et al. | 235/151.3 |
| 4,088,052 A | 5/1978 | Hedrick | 84/454 |
| 4,088,916 A | 5/1978 | Weineck et al. | 310/338 |
| 4,112,879 A | 9/1978 | Assenheimer et al. | 123/32 EA |
| 4,157,802 A | 6/1979 | May, Jr. | 248/346 |
| 4,193,703 A | 3/1980 | Kakmann | 400/124 |
| 4,196,652 A | 4/1980 | Raskin | 84/458 |
| 4,207,791 A | 6/1980 | Murakami | 84/1.01 |
| 4,208,636 A | 6/1980 | German | 331/94.5 P |
| 4,214,215 A | 7/1980 | Mellen et al. | 330/277 |
| 4,228,680 A | 10/1980 | Engel et al. | 73/119 A |
| 4,287,582 A | 9/1981 | Tocquet | 367/163 |
| 4,313,361 A | 2/1982 | Deutsch | 84/1.01 |
| 4,318,023 A | 3/1982 | O'Neill et al. | 310/328 |
| 4,319,843 A | 3/1982 | Gornall | 356/346 |
| 4,327,623 A | 5/1982 | Mochida et al. | 84/454 |
| 4,336,809 A | 6/1982 | Clark | 128/665 |
| 4,388,908 A | 6/1983 | Babitzka et al. | 123/500 |
| 4,426,907 A | 1/1984 | Scholz | 84/454 |
| 4,426,981 A | 1/1984 | Greiner et al. | 123/488 |
| 4,430,899 A | 2/1984 | Wessel | 73/754 |
| 4,432,228 A | 2/1984 | Kuschmierz et al. | 73/119 |
| 4,434,753 A | 3/1984 | Mukainakano et al. | 123/143 |
| 4,435,666 A | 3/1984 | Fukui et al. | 310/328 |
| 4,460,840 A | 7/1984 | Weiger et al. | 310/328 |
| 4,463,727 A | 8/1984 | Babitzka et al. | 123/458 |
| 4,468,583 A | 8/1984 | Mori | 310/328 |
| 4,479,475 A | 10/1984 | Babitzka | 123/446 |
| 4,570,095 A * | 2/1986 | Uchikawa | 310/328 |
| 4,570,096 A | 2/1986 | Hara et al. | 310/328 |
| 4,580,540 A | 4/1986 | Babitzka et al. | 123/458 |
| 4,584,923 A | 4/1986 | Minnick | 84/454 |
| 4,612,440 A | 9/1986 | Brunnee et al. | 250/281 |
| 4,617,952 A | 10/1986 | Fujiwara et al. | 137/85 |
| 4,629,039 A | 12/1986 | Imoto et al. | 188/72.1 |
| 4,629,926 A | 12/1986 | Siegal | 310/331 |
| 4,633,118 A | 12/1986 | Kosugi | 310/328 |
| 4,647,808 A | 3/1987 | Shibuya | 310/328 |
| 4,660,523 A | 4/1987 | Brauer et al. | 123/458 |
| 4,667,639 A | 5/1987 | Linder et al. | 123/450 |
| 4,675,568 A | 6/1987 | Uchikawa et al. | 310/328 |
| 4,697,118 A | 9/1987 | Harnden, Jr. et al. | 310/331 |
| 4,703,215 A | 10/1987 | Asano | 310/328 |
| 4,714,855 A | 12/1987 | Fujimoto | 310/328 |
| 4,725,002 A | 2/1988 | Trachte | 239/102.2 |
| 4,732,071 A | 3/1988 | Deutsch | 84/454 |
| 4,735,185 A | 4/1988 | Imoto et al. | 123/498 |
| 4,736,131 A | 4/1988 | Fujimoto | 310/328 |
| 4,749,897 A | 6/1988 | Natsume et al. | 310/317 |
| 4,750,706 A | 6/1988 | Schlagmüller | 251/129.06 |
| 4,757,223 A | 7/1988 | Ueyama | 310/82 |
| 4,769,569 A | 9/1988 | Stahlhuth | 310/328 |
| 4,777,398 A | 10/1988 | Shibuya | 310/328 |
| 4,783,610 A * | 11/1988 | Asano | 310/328 |
| 4,793,313 A | 12/1988 | Paganon et al. | 123/506 |
| 4,803,908 A | 2/1989 | Skinn et al. | 84/454 |
| 4,808,874 A | 2/1989 | Stahlhuth | 310/328 |
| 4,816,713 A | 3/1989 | Change, Jr. | 310/319 |
| 4,821,726 A | 4/1989 | Tamura et al. | 123/498 |
| 4,835,747 A | 5/1989 | Billet | 367/164 |
| 4,838,233 A | 6/1989 | Hayashi et al. | 123/506 |
| 4,847,193 A | 7/1989 | Richards et al. | 435/6 |
| 4,857,791 A | 8/1989 | Uchino et al. | 310/321 |
| 4,874,978 A | 10/1989 | Sakaida et al. | 310/328 |
| 4,874,979 A | 10/1989 | Rapp | 310/328 |
| 4,874,980 A | 10/1989 | Mine et al. | 310/328 |
| 4,893,750 A | 1/1990 | Haworth et al. | 239/71 |
| 4,907,748 A * | 3/1990 | Gardner et al. | 239/584 |
| 4,909,126 A | 3/1990 | Skinn et al. | 84/454 |
| 4,929,859 A | 5/1990 | Suzuki et al. | 310/328 |
| 4,933,591 A | 6/1990 | Stahlhuth | 310/328 |
| 4,937,489 A * | 6/1990 | Hattori et al. | 310/328 |
| 4,940,037 A | 7/1990 | Eckert | 123/506 |
| 4,947,077 A | 8/1990 | Murata | 310/328 |
| 4,979,275 A | 12/1990 | Sakaida et al. | 29/25.35 |
| 4,999,284 A | 3/1991 | Ward et al. | 435/4 |
| 5,004,946 A | 4/1991 | Sakaida et al. | 310/328 |
| 5,009,142 A | 4/1991 | Kurtz | 84/454 |
| 5,027,027 A | 6/1991 | Orbach et al. | 310/317 |
| 5,028,834 A | 7/1991 | Sakaida et al. | 310/328 |
| 5,034,647 A | 7/1991 | Ohtsuka | 310/328 |
| 5,038,657 A | 8/1991 | Busley | 84/455 |
| 5,040,514 A | 8/1991 | Kubach | 123/490 |
| 5,063,542 A | 11/1991 | Petermann et al. | 367/166 |
| 5,065,660 A | 11/1991 | de Buda | 84/200 |
| 5,072,288 A | 12/1991 | MacDonald et al. | 357/68 |
| 5,078,241 A | 1/1992 | Ackermann et al. | 188/299 |
| 5,080,079 A | 1/1992 | Yoshida et al. | 123/531 |
| 5,094,429 A | 3/1992 | Dostert | 251/129.06 |
| 5,109,885 A | 5/1992 | Tauscher | 137/554 |
| 5,115,880 A | 5/1992 | Sallas et al. | 181/106 |
| 5,157,256 A | 10/1992 | Aaron | 250/306 |
| 5,161,774 A | 11/1992 | Engelsdorf et al. | 251/11 |
| 5,182,484 A | 1/1993 | Culp | 310/328 |
| 5,191,252 A | 3/1993 | Sano | 310/328 |
| 5,199,641 A | 4/1993 | Hohm et al. | 239/102.2 |
| 5,205,147 A | 4/1993 | Wada et al. | 72/429 |
| 5,237,238 A | 8/1993 | Berghaus et al. | 310/328 |
| 5,239,904 A | 8/1993 | Yamaguchi et al. | 83/210 |
| 5,270,984 A | 12/1993 | Mine | 367/140 |
| 5,314,175 A | 5/1994 | Izumi et al. | 269/224 |
| 5,319,257 A | 6/1994 | McIntyre | 310/328 |
| 5,323,680 A | 6/1994 | Miller et al. | 84/455 |
| 5,323,948 A | 6/1994 | Yamazaki et al. | 269/172 |
| 5,328,149 A | 7/1994 | Reuter | 251/129.06 |
| 5,332,942 A | 7/1994 | Rennex | 310/328 |
| 5,335,862 A | 8/1994 | Esper | 239/570 |
| 5,343,793 A | 9/1994 | Pattie | 84/454 |
| RE34,823 E | 1/1995 | Sakaida et al. | 310/328 |
| 5,388,751 A | 2/1995 | Harada et al. | 228/4.5 |
| 5,390,579 A | 2/1995 | Burgon | 84/454 |
| 5,410,206 A | 4/1995 | Luecke et al. | 310/328 |
| 5,410,207 A | 4/1995 | Miura et al. | 310/328 |
| 5,413,076 A | 5/1995 | Koenigswieser et al. | 123/446 |
| 5,425,343 A | 6/1995 | Akaki et al. | 123/490 |
| 5,435,477 A | 7/1995 | Torihata et al. | 228/4.5 |
| 5,444,324 A | 8/1995 | Priest et al. | 310/334 |
| 5,460,202 A | 10/1995 | Hanley et al. | 137/627 |
| 5,465,021 A | 11/1995 | Visscher et al. | 310/328 |
| 5,477,831 A | 12/1995 | Akaki et al. | 123/490 |
| 5,479,064 A | 12/1995 | Sano | 310/328 |
| 5,482,213 A | 1/1996 | Matsusaka et al. | 239/584 |
| 5,500,777 A | 3/1996 | Hasegawa et al. | 360/77.16 |
| 5,501,986 A | 3/1996 | Ward et al. | 436/525 |
| 5,518,184 A | 5/1996 | Potz et al. | 239/533.4 |
| 5,645,226 A | 7/1997 | Bright | 239/585.1 |
| 5,685,485 A | 11/1997 | Mock et al. | 239/102.2 |
| 5,697,554 A | 12/1997 | Auwaerter et al. | 239/88 |
| 5,712,524 A | 1/1998 | Suga | 310/328 |
| 5,746,422 A | 5/1998 | Harada et al. | 228/4.5 |
| 5,751,090 A | 5/1998 | Henderson | 310/328 |
| 5,779,149 A | 7/1998 | Hayes, Jr. | 239/124 |
| 5,780,759 A | 7/1998 | Szalay | 84/454 |
| 5,780,956 A | 7/1998 | Oliver et al. | 310/323 |

| Patent No. | | Date | Inventor | Class |
|---|---|---|---|---|
| 5,780,957 A | | 7/1998 | Oliver et al. | 310/328 |
| 5,803,370 A | | 9/1998 | Heinz et al. | 239/533 |
| 5,810,255 A | | 9/1998 | Itoh et al. | 239/102.2 |
| 5,824,929 A | | 10/1998 | Freeland et al. | 84/454 |
| 5,824,937 A | | 10/1998 | Szalay | 84/654 |
| 5,831,264 A | | 11/1998 | Shedd et al. | 250/306 |
| 5,847,387 A | | 12/1998 | Shedd et al. | 250/306 |
| 5,859,378 A | | 1/1999 | Freeland et al. | 84/454 |
| 5,859,561 A | | 1/1999 | Vanoli | 377/516 |
| 5,875,764 A | | 3/1999 | Kappel et al. | 123/467 |
| 5,881,767 A | | 3/1999 | Löser | 137/599 |
| 5,883,323 A | | 3/1999 | Kaufman | 84/454 |
| 5,886,270 A | | 3/1999 | Wynn | 84/313 |
| 5,901,896 A | | 5/1999 | Gal | 228/4.5 |
| 5,907,211 A | * | 5/1999 | Hall et al. | 310/328 |
| 5,907,212 A | | 5/1999 | Okada | 310/328 |
| 5,907,269 A | | 5/1999 | Zrostlik | 335/215 |
| 5,934,976 A | | 8/1999 | Makino et al. | 451/28 |
| 5,946,969 A | | 9/1999 | Munekata et al. | 74/110 |
| 5,975,428 A | | 11/1999 | Potschin et al. | 239/88 |
| 5,977,467 A | | 11/1999 | Freeland et al. | 84/454 |
| 6,003,836 A | | 12/1999 | Cewers | 251/129.06 |
| 6,016,040 A | | 1/2000 | Hoffmann et al. | 318/116 |
| 6,021,760 A | | 2/2000 | Boecking | 123/467 |
| 6,025,671 A | | 2/2000 | Boecking | 310/369 |
| 6,035,722 A | | 3/2000 | Giersch et al. | 73/714 |
| 6,040,643 A | | 3/2000 | Bruns | 310/26 |
| 6,060,814 A | | 5/2000 | Hoffmann et al. | 310/316.03 |
| 6,062,533 A | | 5/2000 | Kappel et al. | 251/57 |
| 6,104,125 A | | 8/2000 | Pan et al. | 310/328 |
| 6,131,879 A | | 10/2000 | Kluge et al. | 251/129.06 |
| 6,166,307 A | | 12/2000 | Caulkins et al. | 84/50 |
| 6,246,157 B1 | | 6/2001 | Oliver et al. | 310/328 |
| 6,246,287 B1 | | 6/2001 | Yamashita | 330/174 |
| 6,291,928 B1 | | 9/2001 | Lazarus et al. | 310/328 |
| 6,294,859 B1 | * | 9/2001 | Jaenker | 310/328 |
| 6,411,009 B2 | | 8/2002 | Jaenker | 310/316.01 |
| 6,548,938 B2 | * | 4/2003 | Moler et al. | 310/328 |
| 6,642,067 B2 | * | 11/2003 | Dwyer | 438/17 |
| 6,759,790 B1 | * | 7/2004 | Bugel et al. | 310/328 |
| 2001/0030306 A1 | | 10/2001 | Prie | 251/129.06 |

FOREIGN PATENT DOCUMENTS

| | | | | |
|---|---|---|---|---|
| JP | 62-217880 | | 9/1987 | H02N/2/00 |
| JP | 62217880 | | 9/1987 | H02N/2/00 |
| JP | 1-152976 | | 6/1989 | H01L/41/09 |
| JP | 1-217982 | * | 8/1989 | H01L/41/08 |
| JP | 2-218579 | * | 8/1990 | B25J/15/00 |
| JP | 2-260476 | | 10/1990 | 310/328 |
| JP | 4-165966 | | 11/1992 | H02N/2/00 |
| JP | 5-305574 | | 11/1993 | B25B/11/00 |
| JP | 6105568 | | 4/1994 | H02N/2/00 |
| JP | 6-105568 | | 4/1994 | 310/331 |
| JP | 7-236287 | | 5/1995 | H02N/2/00 |
| JP | 10-248-278 | * | 9/1998 | H02N/2/00 |
| WO | WO 98/23868 | | 6/1998 | F15C/5/00 |
| WO | WO0179731 A | | 10/2001 | F16K/31/02 |

* cited by examiner

APPARATUS FOR MOVING A PAIR OF OPPOSING SURFACES IN RESPONSE TO AN ELECTRICAL ACTIVATION

RELATED APPLICATIONS

This application is a divisional application of U.S. patent application Ser. No. 10/067,762 filed on Feb. 6, 2002.

FIELD OF THE INVENTION

The present invention relates to an apparatus for moving a pair of opposing surfaces in response to an electrical activation.

BACKGROUND OF THE INVENTION

Various types of piezoelectric devices are known to those skilled in the art. Many of these devices include complex configurations and are very expensive to manufacture. Other devices include simpler configurations, but are extremely limited in the corresponding maximum range of movement or the corresponding maximum application of force.

In such known devices, when the piezoelectric actuator is electrically activated, the rectangular prism geometry of the device expands predominantly along a predetermined axis. When the piezoelectric device is deactivated, the geometry of the device contracts predominantly along the predetermined axis. This expansion and contraction of the piezoelectric device can be used to operate an apparatus, e.g. to open and close a clamp or valve. An apparatus for clamping or valving typically includes a support having two members spaced with respect to each other. The piezoelectric device is transversely disposed between the two spaced members. As the piezoelectric device expands in a linear direction, the members are driven or pivoted along a curvilinear path. The pivoting of the members along a curvilinear path results in an inefficient transfer of force from the piezoelectric device to the support. The piezoelectric actuator in most known configurations is positioned parallel to the desired motion providing little opportunity to select different hinge axis locations and/or structural configurations to optimize performance.

SUMMARY OF THE INVENTION

The present invention provides an apparatus for moving a pair of opposing surfaces in response to an electrical activation. The apparatus includes a support including a rigid non-flexing portion, first and second pivotable arm portions extending from the rigid portion, a pair of opposing surfaces with one opposing surface on each pivotable arm portion for movement relative to one another, and a force transfer member operably positioned between the first and second pivotable arm portions. An actuator is operably engaged between the rigid non-flexing portion and the force transfer member to drive the force transfer member in movement along a fixed path causing at least one of the first and second pivotable arm portions to pivot in response to an electrical activation of the actuator. The support and force transfer elements of the structure are designed to be rigid, non-flexing elements. Any unplanned flexing can reduce the effective life of the mechanism, and reduces the amount of force transferred through the hinge axes to pivot the arms. The reduction in force limits the displacement and force of the pivoting arms. The selection of the hinge axis location and corresponding structural configuration allows substantial capability to optimize the performance of the apparatus for the particular application.

The piezoelectric actuator can be preloaded with force when installed in the support element. For example, the piezoelectric actuator can be clamped within the support structure with an adjustable screw supporting one end allowing optimal force preloading. An adjustable screw configuration is easy to use and allows a large degree of adjustability. Preloading the piezoelectric actuator in any suitable fashion contributes to maximum efficiency of force transfer during actuation, and allows fine tuning of the initial position of the apparatus prior to actuation of the piezoelectric element. Preloading can also ensure that the piezoelectric actuator maintains contact with the apparatus at opposite ends throughout the range of expansion and contraction. The use of a threaded adjustment screw for preloading enables assembly without requiring adhesives or other means of securely connecting the piezoelectric actuator at opposite ends to the apparatus, and avoids the possibility of damaging tension or torsional moments on the piezoelectric actuator. The threaded adjustment screw allows simple compensation for dimensional variations in the piezoelectric actuator during assembly to the support.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION OF THE PREFERRED EMBODIMENT

Figure 1:
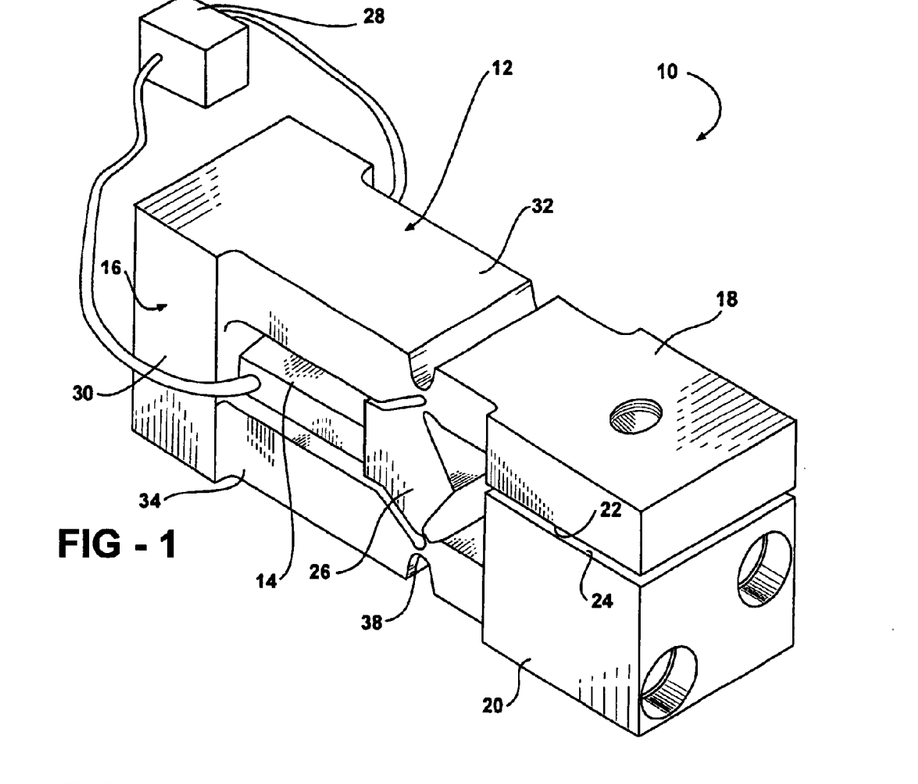
FIG. 1 is a perspective view of one embodiment of an apparatus for moving a pair of opposing surfaces in response to an electrical activation having a support and an actuator in accordance with the present invention.

FIG. 1 is a perspective view of one embodiment of an apparatus 10 having a support 12 and an actuator 14 in accordance with the present invention. The support 12 includes a rigid, non-flexible portion 16, at least one pivotable arm portion, such as first and second pivotable arm portions 18 and 20 extending from the rigid portion 16, a pair of opposing surfaces 22 and 24 with one opposing surface 22, 24 on each pivotable arm portion 18, 20 for movement relative to one another, and a force transfer member 26 operably positioned between the first and second pivotable arm portions 18 and 20. Preferably, the support 12 is a unitary, integral, single-piece body. The actuator 14 is operably engaged between the rigid, non-flexible portion 16 and the force transfer member 26 to drive the force transfer member 26 linearly causing the first and second pivotable arm portions 18, 20 to pivot about corresponding axes and drive the opposing surfaces 22 and 24 apart or away from each other with a loss of motion of less than 40% in response to an electrical activation from a controller 28 in communication with the actuator 14.

When activated, the actuator 14 is designed to produce a positional or spatial displacement predominately along one predetermined axis. The function of the actuator 14 can be performed by one of several different types of piezoelectric devices including an individual piezoelectric element, a stack of individual piezoelectric elements, a mechanically amplified piezoelectric element or stack, or, preferably, a multilayer cofired piezoelectric stack.

When a voltage is applied across the piezoelectric device, the device receives and stores an electrical charge. When charged, the piezoelectric device expands predominately along the one predetermined axis. The expansion of the piezoelectric device produces a spatial displacement along the one predetermined axis increasing the initial uncharged thickness of the device. In this manner, the one predetermined axis functions as an axis of displacement. The amount of electrical charge stored by the piezoelectric device is generally proportional to the amount of voltage applied across the device up to a maximum voltage limit. The amount of expansion along the one predetermined axis is generally proportional to the amount of electrical charge stored by the piezoelectric device. Thus, the amount of expansion along the one predetermined axis can be controlled by varying the amount of voltage applied across the piezoelectric device. For example, applying the maximum amount of voltage across the piezoelectric device produces a maximum amount of expansion along the one predetermined axis and applying one-half the maximum amount of voltage across the piezoelectric device produces approximately one-half the maximum amount of expansion along the one predetermined axis.

The electrical charge on the piezoelectric device is discharged or dissipated when the device is (1) connected directly to ground, (2) electrically shorted directly across the terminal ends, or (3) electrically shorted or grounded through an impedance. When discharged, the piezoelectric device contracts or shrinks along the one predetermined axis back toward the initial uncharged thickness of the device. The discharge of the piezoelectric device can be controlled to produce a spatial displacement along the one predetermined axis decreasing the thickness of the device.

The controller 28 is designed to operate the apparatus 10. To produce a spatial displacement along the predetermined axis, the controller 28 provides a charging voltage across the piezoelectric device. Typically, the amount of spatial displacement is approximately proportional to the charging energy. To return the piezoelectric device to the initial uncharged thickness, the controller 28 provides the necessary discharge means (i.e. the controlled electrical grounding or shorting) described above. The controller 28 is designed to completely charge and completely discharge the piezoelectric device. As a result, the opposing surfaces 22 and 24 of the apparatus 10 are maintained in either a fully open or fully closed position. The controller 28 can be designed to partially charge and partially discharge the piezoelectric device, if desired. As a result, the opposing surfaces 22 and 24 of the apparatus 10 can be maintained in the fully open position, the fully closed position, or any position therebetween (i.e any partially open or partially closed position). The partial opening and closing of the opposing surfaces 22 and 24 can be based directly on sensor feedback or on an algorithm processing such sensor feedback. The controller 28 can be further designed to recycle discharged power by storing power discharged from the piezoelectric device and reusing such power during the next charging of the piezoelectric device. The controller 28 can also be designed to supply such recycled discharged power to one or more other piezoelectric or non-piezoelectric devices.

Figure 2:
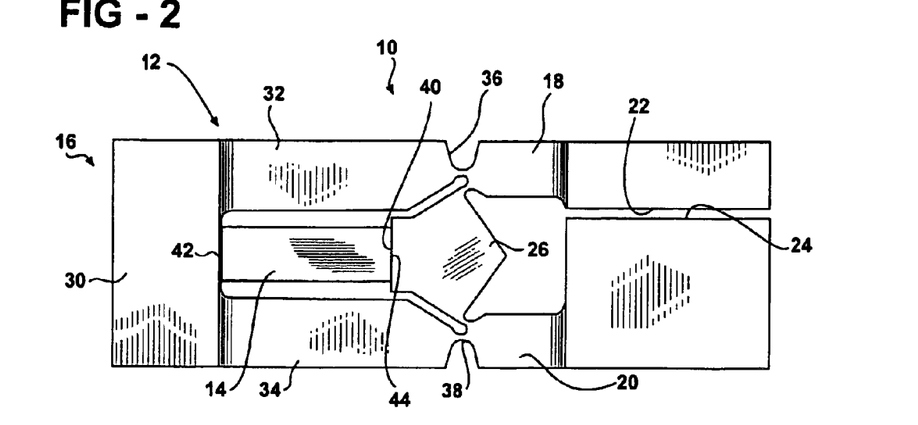
FIG. 2 is a side view of the apparatus of FIG. 1 with the actuator deactivated.

FIG. 2 is a side view of the first embodiment of the apparatus 10. Preferably, the rigid, non-flexing portion 16 of the apparatus 10 is C-shaped including a rigid non-flexing web 30 extending between a pair of rigid non-flexing arm portions 32, 34. At least one pivotable arm portion 18 is pivotably connected via a living integral hinge 36 to one rigid arm portion 32. Another pivotable arm portion 20 can optionally be pivotably connected via a living integral hinge 38 to the other rigid arm portion 34, if two opposing pivotable arms are desired. The force transfer member 26 includes a seat surface 40.

The actuator 14 includes opposite ends 42 and 44 and, as described above, the actuator 14 produces a controlled spatial displacement between the opposite ends 42 and 44 in response to an electrical activation. One end 42 of the actuator 14, hereinafter referred to as the set or fixed end 42, is disposed adjacent to the rigid web 30. The other end 44 of the actuator 14, referred to hereinafter as the driving end 44, is disposed adjacent to the seat surface 40 of the force transfer member. Thus, the actuator 14 is operably engaged between the nonflexing web 30 and the force transfer member 26 for driving the force transfer member 26 away or apart from the rigid web 30 in response to an electrical activation of the actuator 14. In other words, the piezoelectric device is oriented such that the axis of greatest displacement is aligned perpendicular to the web 30 and the seat surface 40.

In FIG. 2, the actuator 14 is deactivated. The opposing surfaces 22 and 24 are closest to each other when the actuator 14 is deactivated. This type of configuration is commonly referred to as a normally closed design. When the actuator 14 is electrically activated, the set end 42 of the actuator 14 is held fixed by the rigid portion 16, the driving end 44 of the actuator 14 drives the force transfer member 26 away or apart from the rigid web 30 (i.e. to the right in FIG. 2), and the first and second pivotable arm portions 18 and 20 are pivoted about living integral hinges 36 and 38 respectively. In this manner, the space or distance between the opposing surfaces 22 and 24 is increased. In other words, when a voltage is applied across the piezoelectric device, the spatial displacement produced along the predetermined axis drives the force transfer member 26 away or apart from the rigid portion 16 pivoting the first and second pivotable arm portions 18 and 20 about the living integral hinges 36 and 38 respectively thus increasing the space or distance between the opposing surfaces 22 and 24. The opening of the opposing surfaces 22 and 24 can be adjusted by varying the amount of voltage applied across the piezoelectric device.

The support 12 is composed of a material having shape memory. Typically, the support material has a high modulus of elasticity and high strength. As a result, the apparatus 10 can be made from a variety of materials including, but not limited to, a metal, such as steel or other metals, an alloy, such as Inconel or other alloys, or a composite material, such as Thornel.

When the actuator 14 is deactivated, the opposing surfaces 22 and 24 are biased toward one another by the shape memory of the support structure material provided the support 12 has not been plastically deformed. In other words, when the piezoelectric device is discharged, the piezoelectric device shrinks or contracts along the axis of expansion and the shape memory of the support structure material biases the force transfer member 26, the first and second pivotable arm portions 18 and 20, and the opposing surfaces 22 and 24 back toward the original shape of the apparatus 10. The closing of the opposing surfaces 22 and 24 can be adjusted by controlling the discharge of the piezoelectric device.

The present invention maximizes the transfer of force from the expansion of the actuator 14 through the force transfer member 26 to the pivoting of the pair of pivotable arm portions 18 and 20 and the opening of the opposing surfaces 22 and 24. For maximum force transfer, the set end 42 of the actuator 14 is fixed by the rigid portion 16. In other words, the apparatus 10 is designed so the rigid portion 16 does not flex or bow when the actuator 14 is activated. In this manner, all of the actuator expansion force is directed through the driving end 44 of the actuator 14 toward the force transfer member 26. To transfer the maximum force from the actuator 14 to the pair of pivotable arm portions 18 and 20, the force transfer member 26 is designed so that the seat surface 40 does not flex or bow when the actuator is activated. The driving end 44 of the actuator 14 remains in operable contact or optimal force transferring contact with the seat surface 40 of the force transfer member 26 at all spatial displacements of the actuator 14, i.e. at the minimum operating spatial displacement, the maximum operating spatial displacement, and all spatial displacements of the actuator therebetween. In other words, the driving end 44 of the actuator 14 remains in operable contact or optimal force transferring contact with the seat surface 40 of the force transfer member 26 when the actuator is deactivated, partially activated, and fully activated.

Figure 3:
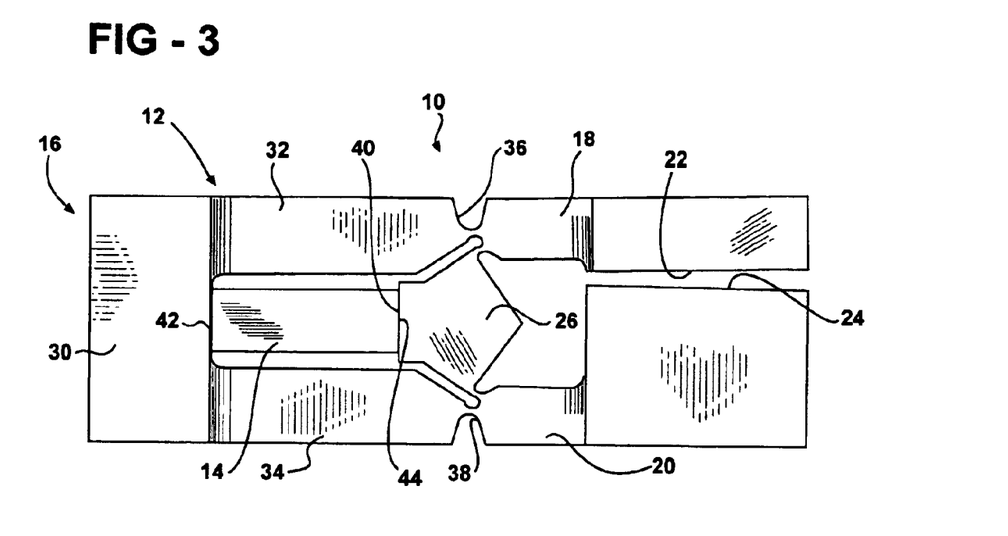
FIG. 3 is an exaggerated side view of the apparatus of FIG. 1 with the actuator partially activated.
Figure 4:
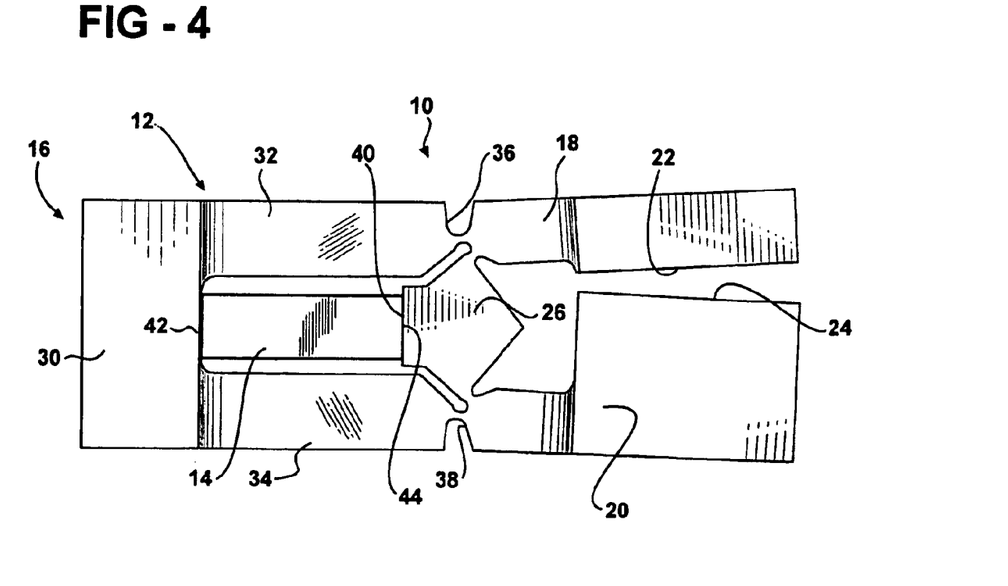
FIG. 4 is an extremely exaggerated side view of the apparatus of FIG. 1 with the actuator fully activated.

In the first embodiment of the apparatus 10, the driving end 44 of the actuator 14 has a planar surface and the seat surface 40 of the force transfer member 26 is a planar surface with the planar end surface 44 of the actuator 14 disposed adjacent to the planar seat surface 40 of the force transfer member 26. FIG. 2 illustrates the planar driving end 44 of the actuator 14 in operable contact with the planar seat surface 40 of the force transfer member 26 when the actuator is deactivated. FIG. 3 illustrates the planar driving end 44 of the actuator 14 in operable contact with the planar seat surface 40 of the force transfer member 26 when the actuator 14 is partially activated and is exaggerated to show a larger opening between the opposing surfaces 22,24 than would normally be seen. FIG. 4 is also exaggerated to illustrate the planar driving end 44 of the actuator 14 in operable contact with the planar seat surface 40 of the force transfer member 26 when the actuator 14 is fully activated and shows a larger opening between the opposing surfaces 22,24 than would actually be seen in the fully activated position.

Figure 5:
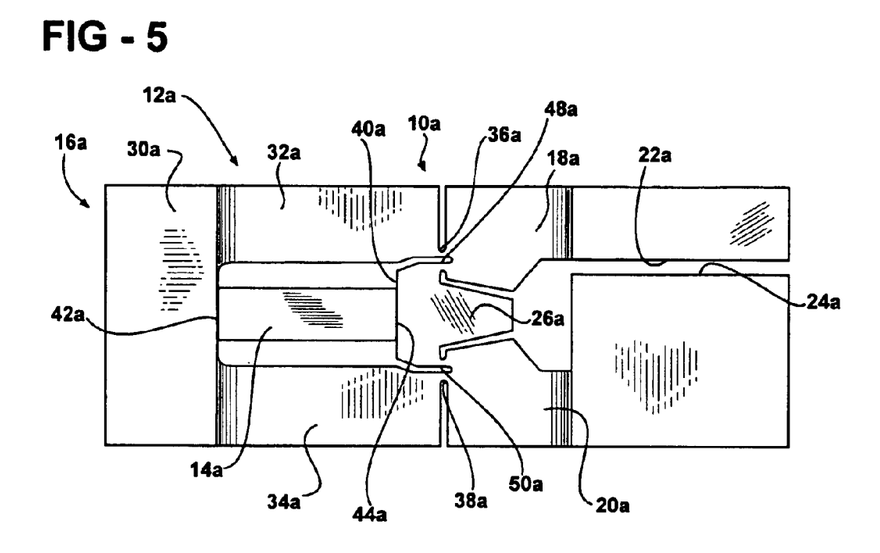
FIG. 5 is a second embodiment of the apparatus with the support including a force transferring member having an alternative shape.

FIG. 5 is a second embodiment of the apparatus 10a with the force transfer member 26a having an alternative T-shape. The apparatus 10a includes a support 12a and an actuator 14a similar to that previously described for the other embodiments. The support 12a includes a rigid non-flexing portion 16a, at least one pivotable arm portion 18a, 20a extending from the rigid non-flexing portion 16a, a pair of opposing surfaces 22a, 24a with one opposing surface 22a, 24a on each pivotable arm portion 18a, 20a for movement relative to one another, and a force transfer member 26a operably positioned between the first and second pivotable arm portions 18a, 20a. Preferably, as with the other embodiments the entire support 12a is formed as a unitary, integral, single-piece body. The actuator 14a is operably engaged between the rigid portion 16a and the force transfer member 26a to drive the force transfer member 26a in linear motion away from the rigid web 30. Movement of the force transfer member 26a pivots the first and second pivotable arm portions 18a, 20a about the living integral hinges 36a, 38a respectively. A controller (not shown) can be provided to operate the apparatus 10a. The controller can provide a charging voltage across a piezoelectric device to produce spatial displacement along a predetermined axis as previously described for the other embodiments. The rigid portion 16a of the apparatus 10a can include a C-shaped web 30a extending between a pair of rigid arm portions 32a, 34a. One pivotable arm portion 18a is pivotably connected via the living integral hinge 36a to one rigid non-flexing arm portion 32a, and the other pivotable arm portion 20a is pivotable connected via the living integral hinge 38a to the other rigid non-flexing arm portion 34a. The force transfer member 26a can include a seat surface 40a. The actuator 14a includes opposite ends 42a and 44a. The actuator 14a produces a controlled spatial displacement along the predetermined axis between opposite ends 42a and 44a in response to an electrical activation. One end 42a of the actuator 14a, such as a set or fixed end 42a, is disposed adjacent to the rigid web 30a. The other end 44a of the actuator 14a, such as a driving end 44a, is disposed adjacent to the seat surface 40a of the force transfer member 26a. When the actuator 14a is electrically activated, the set end 42a of the actuator 14a is held fixed by the rigid portion 16a, the driving end 44a of the actuator 14a drives the force transfer member 26a away or apart from the rigid portion 16a (i.e. to the right in FIG. 5), and the first and second pivotable arm portions 18a, 20a are pivoted about the living integral hinges 36a, 38a respectively, with a loss of motion of less than 40%. In this configuration, the forces transferred from the force transfer member 26a to the pivotable arm portions 18a, 20a are transmitted through force transfer webs or hinges 48a, 50a extending between the force transfer member 26a and the corresponding pivotable arm portions 18a, 20a. The line of force transfer is generally parallel to the predetermined axis of spatial expansion of the piezoelectric actuator 14a, and preferably perpendicular to the fulcrum axis or axis of rotation of the pivotable arm portions 18a, 20a about the corresponding living integral hinges 36a, 38a.

Figure 6:
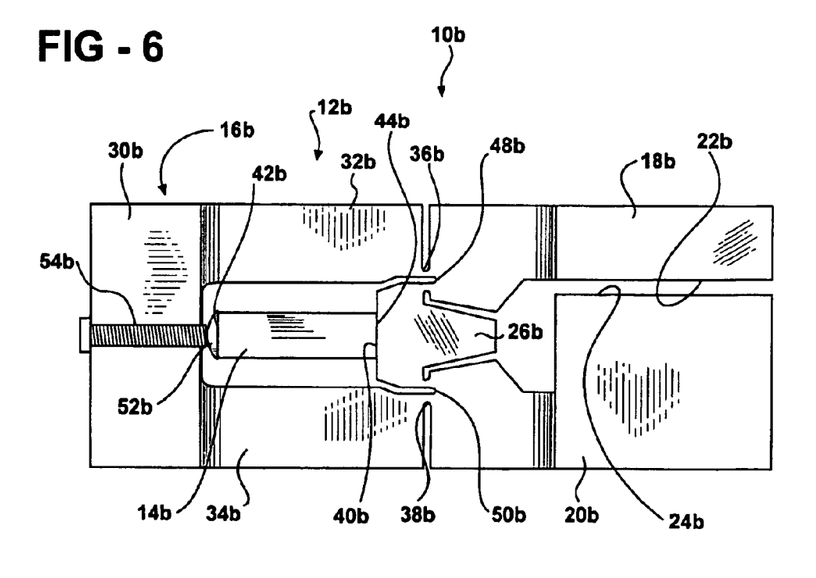
FIG. 6 is a third embodiment of the apparatus with the support including an adjustable seat.

FIG. 6 is a third embodiment of the apparatus 10b with an adjustable seat 52b supported by the rigid portion 16b with an adjustable support 54b. The apparatus 10b includes a support 12b and an actuator 14b similar to that previously described for the other embodiments. The support 12b includes a rigid non-flexing portion 16b, at least one pivotable arm portion 18b, 20b extending from the rigid non-flexing portion 16b, a pair of opposing surfaces 22b, 24b with one opposing surface 22b, 24b on each pivotable arm portion 18b, 20b for movement relative to one another, and a force transfer member 26b operably positioned between the first and second pivotable arm portions 18b, 20b. Preferably, as with the other embodiments the entire support 12b is formed as a unitary, integral, single-piece body. The actuator 14b is operably engaged between the rigid portion 16b and the force transfer member 26b to drive the force transfer member 26b in linear motion away from the rigid portion 16b. The rigid portion 16b supports with an adjustable support 54b an adjustable seat 52b having a complementary surface to the end 42*b* of the actuator 14*b*. The complementary surface of the adjustable seat 52*b* can be flat or shaped in any manner to support the actuator 14*b* in a position suitable for driving the force transfer member 26*b* in response to electrical actuation of the actuator 14*b*. Movement of the force transfer member 26*b* pivots the first and second pivotable arm portions 18*b*, 20*b* about the living integral hinges 36*b*, 38*b* respectively. A controller (not shown) can be provided to operate the apparatus 10*b*. The controller can provide a charging voltage across a piezoelectric device to produce spatial displacement along a predetermined axis as previously described for the other embodiments. The rigid portion 16*b* of the apparatus 10*b* can include a web 30*b* extending between a pair of rigid arm portions 32*b*, 34*b*. One pivotable arm portion 18*b* is pivotably connected via the living integral hinge 36*b* to one rigid arm portion 32*b*, and the other pivotable arm portion 20*b* is pivotable connected via the living integral hinge 38*b* to the other rigid arm portion 34*b*. The force transfer member 26*b* can include a seat surface 40*b*. The actuator 14*b* includes opposite ends 42*b* and 44*b*. The actuator 14*b* produces a controlled spatial displacement along the predetermined axis between opposite ends 42*b* and 44*b* in response to an electrical activation. One end 42*b* of the actuator 14*b*, such as a set or fixed end 42*b*, is disposed adjacent to the rigid web 30*b* as shown in the previous embodiments, or supported by the adjustable seat 52*b* connected to the rigid web 30*b*. The other end 44*b* of the actuator 14*b*, such as a driving end 44*b*, is disposed adjacent to the seat surface 40*b* of the force transfer member 26*b*. When the actuator 14*b* is electrically activated, the set end 42*b* of the actuator 14*b* is held fixed by the adjustable seat 52*b* connected to the rigid portion 16*b*, the driving end 44*b* of the actuator 14*b* drives the force transfer member 26*b* away or apart from the rigid portion 16*b* (i.e. to the right in FIG. 6), and the first and second pivotable arm portions 18*b*, 20*b* are pivoted about the living integral hinges 36*b*, 38*b* respectively, with a loss of motion of less than 40%. In this configuration, the forces transferred from the force transfer member 26*b* to the pivotable arm portions 18*b*, 20*b* are transmitted through force transfer webs or hinges 48*b*, 50*b* extending between the force transfer member 26*b* and the corresponding pivotable arm portions 18*b*, 20*b*. The line of force transfer is generally parallel to the predetermined axis of spatial expansion of the piezoelectric actuator 14*b*, and preferably perpendicular to the fulcrum axis or axis of rotation of the pivotable arm portions 18*b*, 20*b* about the corresponding living integral hinges 36*b*, 38*b*. It should be recognized that the adjustable support 54*b* and complementary seat 52*b* illustrated in FIG. 6 can be used in the other embodiments illustrated in FIGS. 1–5 without departing from the spirit and scope of the present invention.

Referring now to the invention in general, the apparatus according to the present invention is based on mechanical conversion of the motion and force of the actuator by means of the force transfer member. The actuator is preferably a solid state device that increases its size in one or more dimensions when electrically or magnetically stimulated. An example of such a device is a cofired piezoelectric stack. Further, the device preferably has a rectangular prism geometry. The actuator is disposed within the body cavity of the support. The body cavity is bounded on one side by the inside surface of the rigid non-flexing web and on the other side by the inside surface of the moveable force transfer member. The body cavity is further bounded by the upper inside surface of the support defined by the rigid non-flexing arm portion and the opposing lower inside surface of the support defined by the rigid non-flexing arm portion. The actuator is mounted within the body cavity so that one face or end of the actuator is in direct contact with the inside surface of the web, while the opposing face or end of the actuator is in direct contact with the inside surface of the force transfer element. In other words, the actuator is under continuous compression from the inside surface of the web and the inside surface of the force transfer element. If desired, an adjustable rigid non-flexing support member can be connected to the web for adjustably supporting the one face of the actuator in compression against the opposing face of the force transfer element.

The actuator is actuated by application of appropriate electrical power. The electrical power is controlled by a controller similar to that illustrated as 28 in FIG. 1. The controller, in its simplest form, can be a switching device. The controller is connected to the actuator via electrical wires. The controller can have multiple embodiments. For example, it can be designed to fully actuate and fully deactuate the actuator. It can be designed to actuate the actuator to any increment between fully extended and fully retracted. It can also be designed to reuse or redirect the power in the actuator to optimize efficiency.

When the actuator is deenergized or unactuated, it is at a rest position with initial uncharged dimensional conditions. When energized or actuated, the actuator expands along one or more axes as determined by the material properties of the actuator. This expansion is due to the piezoelectric, electrorestrictive, or magnetorestrictive phenomenon depending on the type of actuator actually used in a specific embodiment of this invention. The actuator is designed so that the spatial dimension of maximum expansion when actuated is in line with the two bounding inside surfaces of the web and the force transfer member. Since the actuator is under compression by the two bounding inside surfaces of the web and force transfer member, when the actuator is electrically actuated and expands along the primary expansion axis, the actuator will exert additional pressure against the two bounding inside surfaces.

The web is designed to provide a rigid structure for the actuator to push directly against, or indirectly against through the adjustable seat. Since the web constrains the actuator, the force transfer element, which is designed to move within the apparatus, is displaced by the expanding actuator. The force transfer element in turn is connected via integral hinges or webs, to the upper pivotable arm and the lower pivotable arm. The force transfer element is connected to the upper and lower arms with webs, and the integral hinges divide the pivotal arm portions from the rigid arm portions of the support. Both rigid non-flexing arm portions serve as structural members integral with the rigid non-flexing web. The hinges are designed so that the force and displacement generated by the piezoelectric element travel through the force transfer element and are focused and applied extremely close to the fulcrum of the hinges. Therefore, the force transfer element transfers a substantial portion of the force and displacement of the expanding actuator to the pivotable arms through the webs. The apparatus is designed so that the expansion of the actuator causes the upper and lower pivotable arm portions to pivot outward about the integral hinges so that the face of one of the pivotable arm separates from the face of the other pivotable arm with a loss of motion of less than 40%. Deactuation of the actuator restores the spatial displacement of the force transfer element to the initial position along the predetermined axis. This in turn causes the overall structure of the support to revert to the initial or rest state.

The piezoelectric actuator is preferably preloaded with force when installed in the support. If desired, the piezoelectric actuator can be clamped within the support with an adjustable seat positioned between the rigid non-flexing web and one end of the actuator. By way of example and not limitation, an adjustable screw configuration can be used for this purpose, or any other suitable arrangement allowing for optimal force preloading on the piezoelectric actuator can be provided. Preloading contributes to maximum efficiency of force transfer from the piezoelectric actuator to the support during actuation. Preloading also allows fine tuning of the initial, uncharged position of the apparatus according to the present invention. Proper preloading ensures that the piezoelectric actuator remains in contact with the support at both ends during the full range of expansion and contraction without requiring the use of adhesive or other measures to secure the piezoelectric actuator to the support. Preloading also helps to avoid the possibility of subjecting the piezoelectric actuator to undesirable tension or torsional moments, which could cause damage. An adjustable seat for one end of the piezoelectric actuator allows for simple compensation of dimensional variations of the piezoelectric actuator during assembly of the apparatus.

The present invention is disclosed and discussed in detail with respect to at least one pivotable arm portion, and preferably two opposing pivotal arm portions. It should be recognized that the present invention includes both symmetrical and asymmetrical movement of the pivotal arm portions. If desirable, the integral hinges can be provided to provide non-symmetric operation of at least one pivotable arm portion. By way of example and not limitation, this type of movement can be desirable in some valving or clamping configurations.

Figure 7:
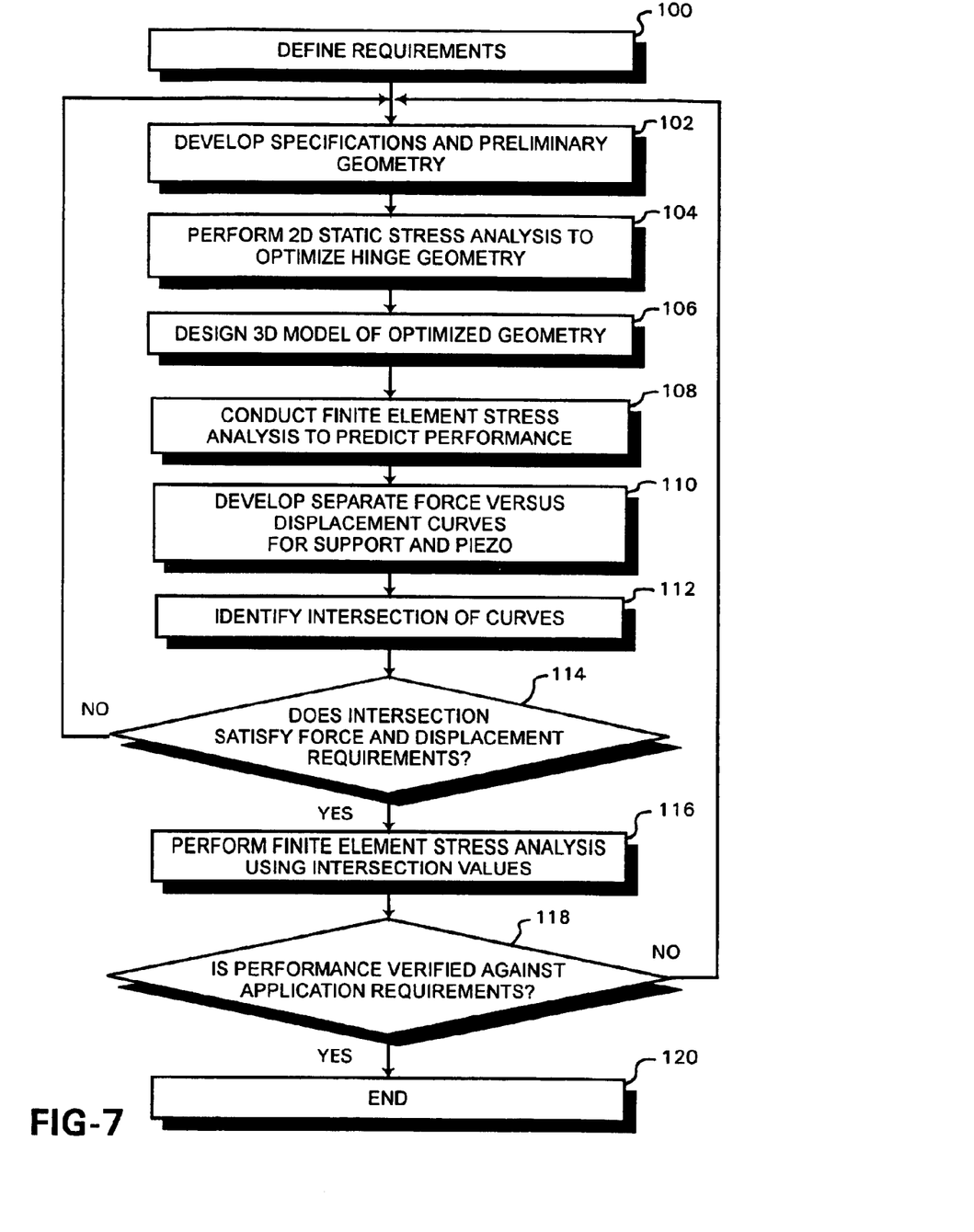
FIG. 7 is a simplified flow chart illustrating the process of optimizing the flex axis of the present invention.
Figure 8:
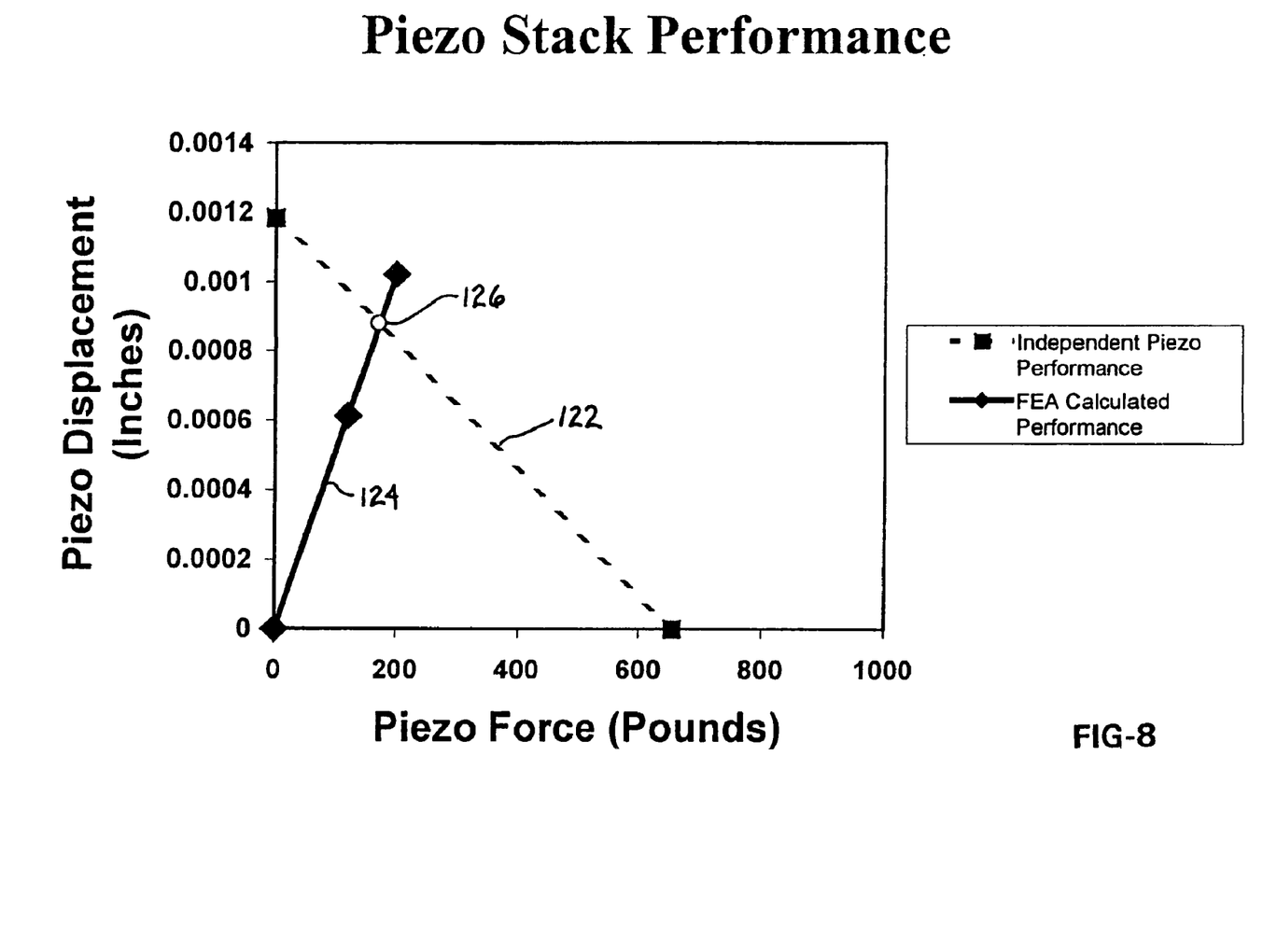
FIG. 8 is a set of separate intersecting curves showing force versus displacement for the mechanical support and the piezoelectric element according to a process of the present invention for optimizing the hinge geometry of the mechanical support.

Referring now to FIG. 7, a simplified flow chart illustrates the optimization of the orientation of the hinge members of the mechanical support according to the present invention. Beginning at step 100, the requirements of the application are defined. The requirements can be a selection of parameters, by way of example and not limitation, including the parameters of force, displacement, size, operating frequency, cycle life, temperature, operating voltage, operating power, vibration, impact resistance, environmental resistance, corrosion resistance, production cost, hysteresis, linearity, and/or repeatability. After the requirements are defined in step 100, the process continues to step 102 where specifications and preliminary geometry of the mechanical support are developed. The process then continues to step 104 where two dimensional (2D) static stress analysis is performed to optimize the hinge geometry of the mechanical support. A three dimensional (3D) computer aided design (CAD) model is then designed in step 106 based on the optimized geometry obtained in step 104. Finite element stress analysis (FEA) is then conducted in step 108 to predict performance of the mechanical support and piezoelectric element. In conducting the analysis, it has been found useful to apply 20% of the maximum force of the piezoelectric element to the force arms for one series of analysis. It has also been found useful to run a series of analysis while constraining the arms of the mechanical support and applying force to the force transfer element to determine the force available from the pivotable arms with no displacement. As a result of the finite element stress analysis separate curves are developed of force versus displacement for the mechanical support and the piezoelectric element. These curves are graphed on the same common axes in step 110 to determine if an intersection of the curves occurs. By way of example and not limitation, one set of these curves is illustrated in FIG. 8, where the piezoelement curve is labeled 122 and the mechanical support curve is labeled 124. FIG. 8 illustrates an exemplary intersection of the two curves 122,124 at the point labeled 126. The identification of the intersection of the curves occurs in step 112. In query 114, it is determined if the intersection satisfies the force and displacement requirements previously set in step 100. If the requirements are not satisfied, the process branches back to step 102, where the model can be modified and reanalyzed. If the requirements are satisfied, the process branches to step 116. In step 116, the finite element stress analysis is performed again using the values corresponding to the point 126 of intersection of the two curves 122, 124. The process then proceeds to query 118 to determine if the performance is verified against the application requirements selected in step 100. If the performance is not verified, the process branches back to step 102, where the model can be modified, and reanalyzed. If the performance is verified, the process ends at step 120.

The apparatus is designed using finite element analysis to meet several criteria. The support must provide repeated operation. Operating life in excess of 100 million cycles can reasonably be expected. For a given actuator, the length of the pivotable arm portions, and the geometry of the integral hinges can be designed to provide varying amounts of separation of the faces.

A characteristic of this invention is that the force transfer element, the hinges, the pivotable arm portions, the rigid arm portions, and the web are an integral, single, unitary, or monolithic body. That is, there are no fasteners joining these components. Elimination of the fastening methods results in highly efficient transfer of force and displacement from the actuator to the support.

Another characteristic of the support of the present invention is that the actuator is oriented so that the primary axis of expansion is at a right angle with respect to the axis of pivot of the pivotable arms. This characteristic is beneficial in several respects. Foremost is that it enables a hinge geometry where the force application point from the force transfer element can be extremely close to the fulcrum of the hinges. This enables the ability to maximize the force transfer efficiency. An additional advantageous result of this geometry is that it enables a compact overall design of the apparatus. A further benefit is that the geometry is readily supportive of size scaling from approximately less than 1 cubic inch to approximately 20 cubic inches. This scalability in size provides the design envelope for a broad range of displacements from approximately $\frac{1}{10,000}$ inch to approximately 0.25 inches. Similarly, the geometry provides for a wide range of clamping forces from less than 1 pound to more than 100 pounds. Yet another benefit is that the entire surface of both faces of the piezoelectric element remain in compressed contact with the opposing faces of the support structure; namely, the rigid web 30 at one end and the force transfer element 26 at the opposite end.

In the embodiments illustrated in FIGS. 1–6, these components have been machined from a single piece of metallic material for example stainless steel. Other suitable materials can include powdered metal, metallic alloys, composite materials, or a combination of metallic and composite materials. Although these materials given as examples provide excellent performance, depending on the requirements of a particular application, use of other materials for the support can be appropriate.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for optimizing hinge geometry comprising the steps of:

developing preliminary geometry based on defined force and displacement requirements;

performing two dimensional stress analysis to optimize orientation of hinge geometry;

designing a three dimensional model of the optimized orientation of the hinge geometry;

conducting finite element stress analysis on the three dimensional model to predict performance;

analyzing separate curves for force versus displacement for a support and a piezoelectric actuator;

identifying an intersection of the curves;

determining if the intersection of the curves satisfies the predefined force and displacement requirements;

if the intersection of the curves does not satisfy the predefined force and displacement requirements, returning to the developing step;

if the intersection of the curves does satisfy the predefined force and displacement requirements, conducting finite element stress analysis of the three dimensional model using values corresponding to the intersection of the curves;

determining if performance of the three dimensional model with finite element stress analysis using values corresponding to the intersection of the curves is verified against application requirements; and if performance is not verified, returning to the developing step.

2. An apparatus according to the method of claim 1 for moving at least one of a pair of opposing surfaces in response to an electrical activation comprising:

a support including a rigid non-flexing portion, at least one pivotable arm portion extending from the rigid portion, a pair of opposing surfaces with one opposing surface on the at least one pivotable arm portion for movement relative to one another, and a force transfer member operably positioned for driving the at least one pivotable arm portion in rotational movement; and an actuator operably engaged between the rigid portion and the force transfer member to drive the force transfer member relative to the rigid portion to pivot the at least one pivotable arm portion in response to an electrical activation of the actuator.

3. The apparatus of claim 2 wherein the support is a single piece.

4. The apparatus of claim 2 wherein the actuator is a piezoelectric device.

5. The apparatus of claim 2 wherein the rigid portion is C-shaped including a web extending between a pair of rigid arm portions.

6. The apparatus of claim 5 wherein one of the pivotable arm portions is pivotably connected to one of the rigid arm portions and the other of the pivotable arm portions is pivotably connected to the other of the rigid arm portions.

7. The apparatus of claim 2 wherein the actuator includes opposite ends and produces a spatial displacement between the opposite ends in response to an electrical activation.

8. The apparatus of claim 7 wherein the rigid portion supports a seat surface.

9. The apparatus of claim 8 wherein one of the opposite ends of the actuator is a planar surface and the seat surface supported by the rigid portion is a planar surface with the planar end surface of the actuator disposed adjacent to the planar seat surface supported by the rigid portion.

10. The apparatus of claim 9 wherein the planar end surface of the actuator applies force to the planar seat surface supported by the rigid portion in response to a spatial displacement of the actuator.

11. The apparatus of claim 10 wherein the planar end surface of the actuator operably contacts the planar seat surface supported by the rigid portion at a minimum operating spatial displacement of the actuator.

12. The apparatus of claim 10 wherein the planar end surface of the actuator operably contacts the planar seat surface supported by the rigid portion at a maximum operating spatial displacement of the actuator.

13. The apparatus of claim 10 wherein the planar end surface of the actuator operably contacts the planar seat surface supported by the rigid portion at all spatial displacements between a minimum operating spatial displacement of the actuator and a maximum operating spatial displacement of the actuator.

14. The apparatus of claim 2 wherein the force transfer member includes a seat surface.

15. The apparatus of claim 14 wherein one of the opposite ends of the actuator is a planar surface and the seat surface of the force transfer member is a planar surface with the planar end surface of the actuator disposed adjacent to the planar seat surface of the force transfer member.

16. The apparatus of claim 15 wherein the planar end surface of the actuator applies force to the planar seat surface of the force transfer member in response to a spatial displacement of the actuator.

17. The apparatus of claim 16 wherein the planar end surface of the actuator operably contacts the planar seat surface of the force transfer member at a minimum operating spatial displacement of the actuator.

18. The apparatus of claim 16 wherein the planar end surface of the actuator operably contacts the planar seat surface of the force transfer member at a maximum operating spatial displacement of the actuator.

19. The apparatus of claim 16 wherein the planar end surface of the actuator operably contacts the planar seat surface of the force transfer member at all spatial displacements between a minimum operating spatial displacement of the actuator and a maximum operating spatial displacement of the actuator.

20. The apparatus of claim 2 wherein the rigid portion, the pivotable arm portion and the force transfer member meet at one location to form a force transfer mechanism.

21. The apparatus of claim 3 further comprising an integral spring defined where at least one pivotable portion attaches to the rigid portion.

* * * * *